United States Patent

Fisher et al.

[11] Patent Number: 6,036,374
[45] Date of Patent: Mar. 14, 2000

[54] ROTATING GUIDE FOR CAM BEARING CAGE

[75] Inventors: Robert E. Fisher, Kalamazoo, Mich.;
Abhay Kumar, South Bend, Ind.

[73] Assignee: AlliedSignal Inc., Morristown, N.J.

[21] Appl. No.: 09/121,739

[22] Filed: Jul. 23, 1998

[51] Int. Cl.$^7$ .............................. F16C 33/46; F04B 1/12
[52] U.S. Cl. .................................... 384/621; 91/499
[58] Field of Search ............................. 384/618, 621, 384/622, 623; 417/269; 91/499

[56] References Cited

U.S. PATENT DOCUMENTS

| | | | |
|---|---|---|---|
| 3,691,910 | 9/1972 | Reichel et al. ........................... | 91/499 |
| 3,807,283 | 4/1974 | Alderson et al. ......................... | 91/499 |
| 4,042,309 | 8/1977 | Hiraga ................................. | 384/621 X |
| 4,981,419 | 1/1991 | Kayukawa et al. ................. | 384/621 X |

*Primary Examiner*—Thomas R. Hannon
*Attorney, Agent, or Firm*—Larry J. Palguta

[57] ABSTRACT

A cam (23) provides a rotating guide surface (33) for the cage (30) of the roller elements (25, 26) of a bearing (22) used to support the load on the cam of an axial piston pump (11) that uses pistons (17, 18) having no shoes or slippers. The rotating guide surface (33) is provided by extending a cylindrical surface (34) from the rotating cam (23) through the inside diameter, or around the outside diameter of the rolling element cage (30), concentric to the centerline of rotation.

13 Claims, 2 Drawing Sheets

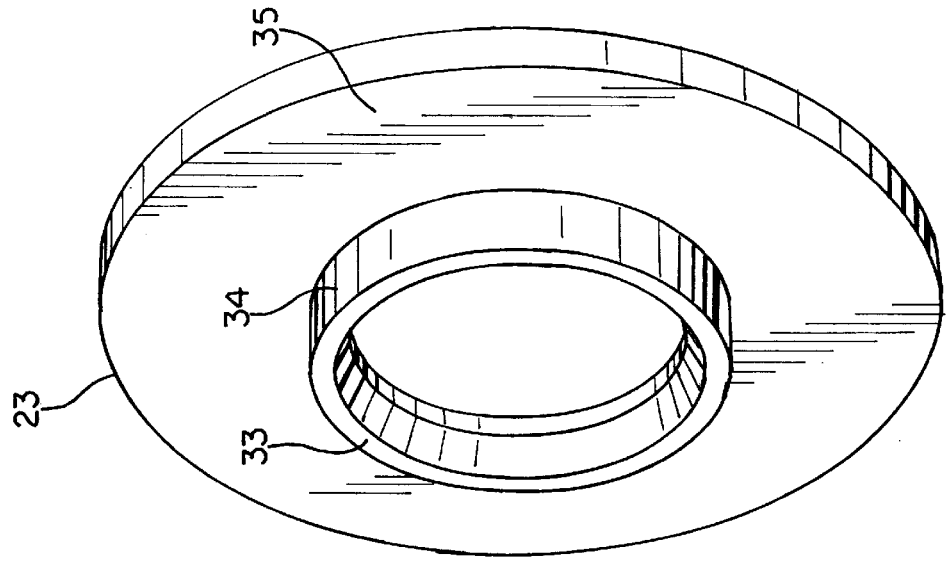
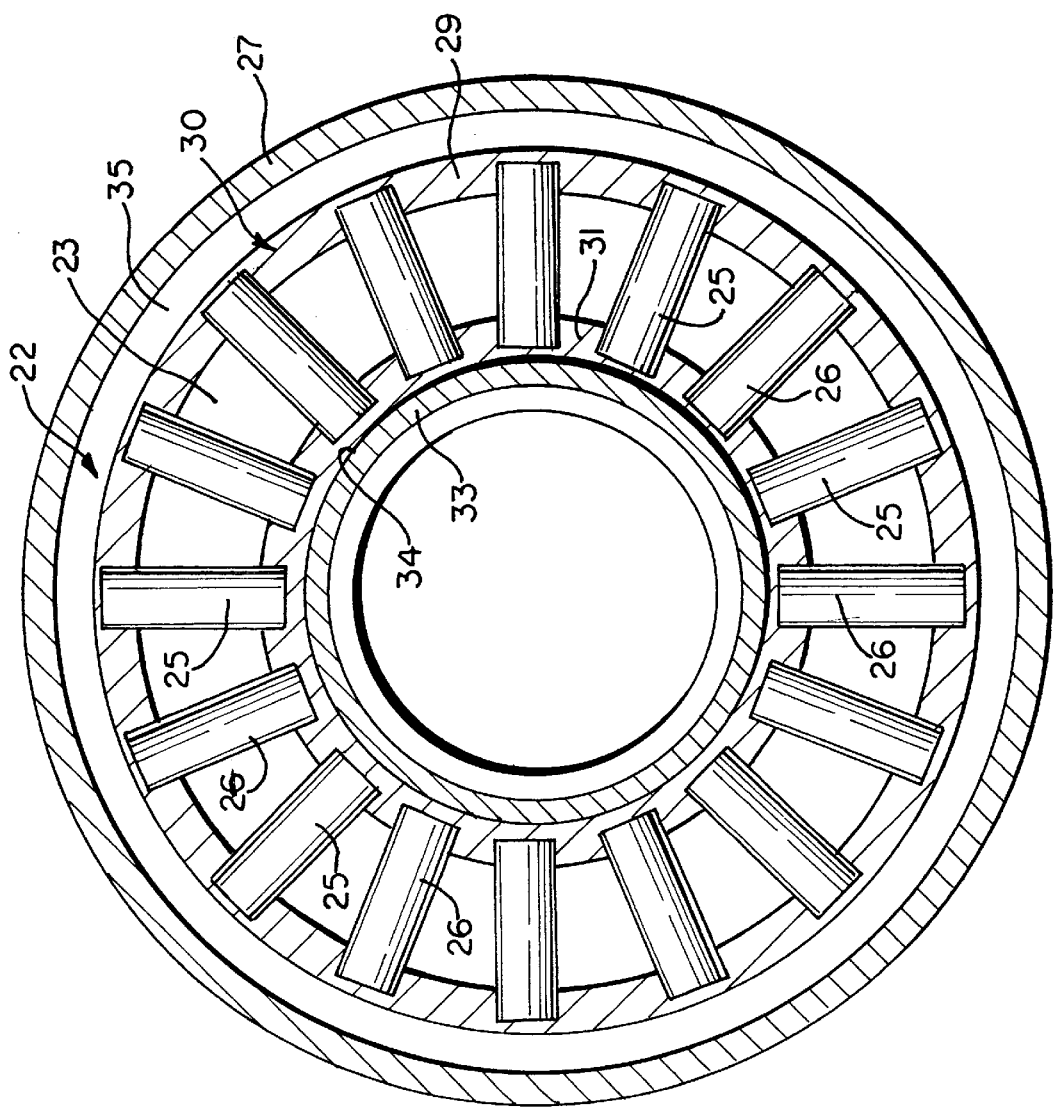

ROTATING GUIDE FOR CAM BEARING CAGE

The present invention relates generally to journals or bearings and more particularly to an improved bearing arrangement for cam actuated axial piston pumps.

In an electro-hydrostatic actuator and numerous other applications, the use of an axial piston pump is desired. Pumps of this type may employ a plurality of pistons reciprocable in a like plurality of cylinders disposed with parallel cylindrical axes extending in a cylindrical pattern. The pistons are sequentially operated by a cam surface. In some applications, the pump cylinders are fixed and the pistons are actuated by a "wobble plate" which is a non-rotating disk or plate having an off-axis bearing driven by the pump motor. The several pistons may also be made part of a centrally rotatable structure with the pistons engaging an off-axis cam surface. As the central structure and pistons rotate, the pistons are sequentially actuated by the cam surface. In some cases, the pistons have a shoe or slipper which slides along a fixed cam surface. A controlled leakage provides the required shoe lubrication, but lowers the efficiency of such pump designs. The operating characteristics of such a pump make a shoeless or slipperless design desirable. Shoeless pistons typically require a cam surface that can rotate in concert with the pistons in their travel circumferentially as they are moved reciprocally in and out of the cylinder bores by the action of the cam inclined surface. A rolling element bearing placed under the cam surface to support the load and allow the pistons to cause the cam surface to rotate is a common practice. The prior art has used an unguided bearing cage in the use of spherical rolling elements or a bearing cage guided by a stationary cylindrical surface in the use of cylindrical rolling elements. Thus, the prior art approach is to use a stationary guide post or bushing to guide both the cage and the rotating cam surface. Rapid accelerations of the rotating parts and the asymmetric loading of the rolling element bearing make it desirable to have a motivating force to assist the rolling element cage in its rotational motion.

The present invention provides solutions to the above problems by providing an extension of a cylindrical surface from the rotating cam plate element through the center of the bearing cage or over the circumference of the cage thereby utilizing the rotation of the cam surface to apply a motivating force to the cage of the rolling elements. The present invention includes a roller bearing comprising a plurality of roller elements, a bearing cage for maintaining relative locations of the roller elements, a disk having one face engaging and supported by the bearing, and a skirt extending from the disk and engaging slidingly the bearing cage to maintain locations of the bearing elements relative to the disk.

In accordance with another aspect of the invention, a roller bearing has a plurality of generally cylindrical roller elements maintained in a radial configuration by a bearing cage. There are a plurality of pump pistons disposed generally in a circular pattern and reciprocable along a like plurality of correspondingly parallel axes. A pump piston actuating cam is held captive between the roller bearing and the pump pistons and includes a cam portion for maintaining the bearing location relative to the cam. The cam portion may comprise a cylindrical surface or skirt extending from the cam and slidingly engaging the bearing cage.

BRIEF DESCRIPTION OF THE DRAWING

FIG. 2 is a cross-sectional view of the cam and bearing along lines 2—2 of FIG. 1; and FIG. 3 is a perspective view of the cam of FIGS. 1 and 2.

Corresponding reference characters indicate corresponding parts throughout the several views of the drawing.

DESCRIPTION OF THE PREFERRED EMBODIMENT

Figure 1:
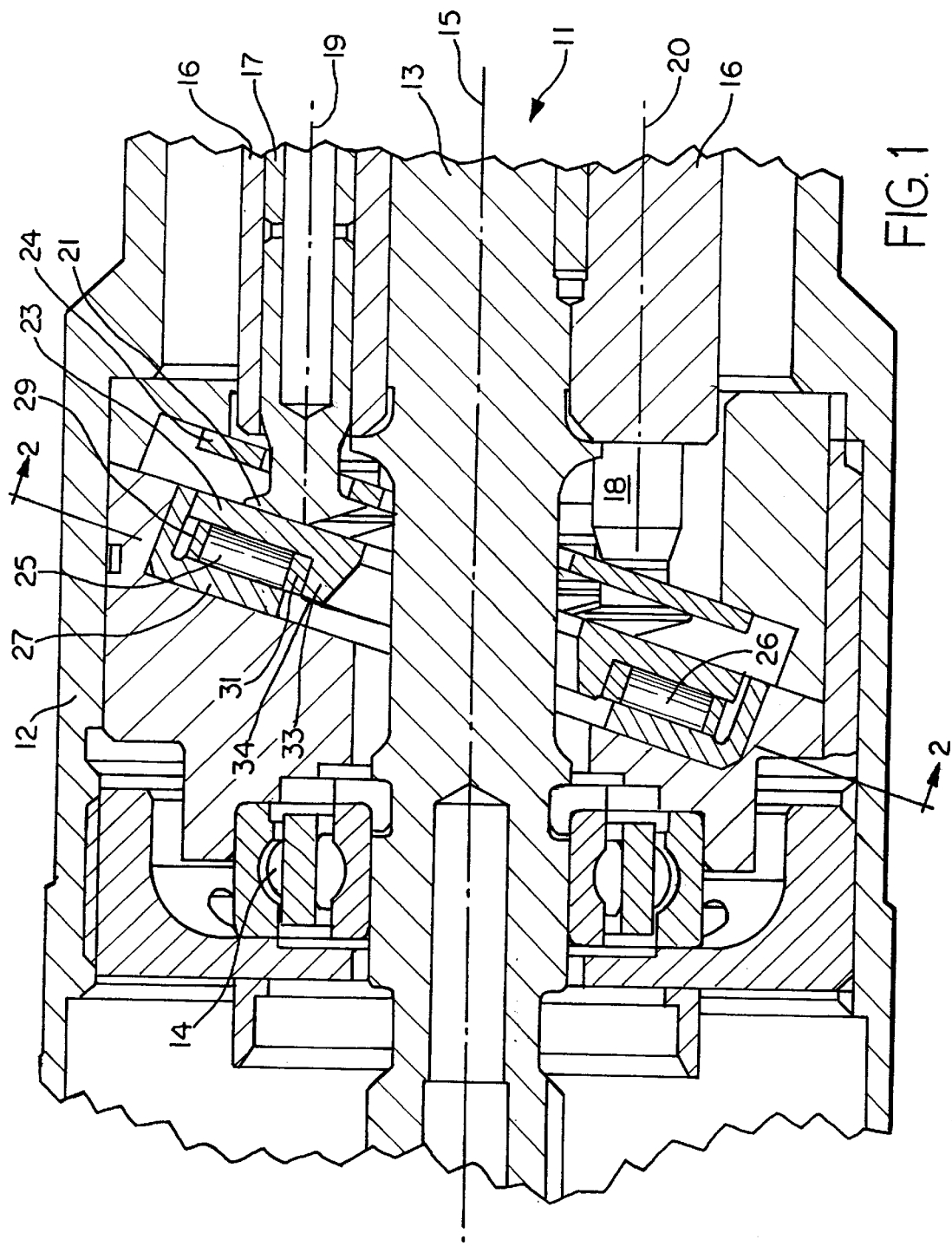
FIG. 1 is a view in cross-section of a portion of a cam actuated hydraulic pump incorporating the invention.

In FIG. 1, a pump mechanism 11 has a housing 12 within which a cylinder or drive shaft 13 is journalled by bearings such as 14 for rotation about the axis 15. There are a plurality (nine in one preferred implementation) of pump pistons such as 17 and 18 disposed generally in a circular pattern. These pistons occupy respective pump cylinders 16 within cylinder 13 and are reciprocable therein relative to both the housing 12 and the cylinder 13 along a like plurality of correspondingly parallel axes such as 19 and 20. That is, any two piston axes define a common plane in which they are parallel. Each piston is coupled with a cam member or disk 23 by means of an auxilliary cam plate 24 as shown in FIG. 1 and has a generally conical head such as 21 which engages the cam member or disk 23. Cam 23 is obliquely disposed or tilted relative to the parallel axes 15, 19 and 20. Roller bearings 25, 26 shown in more detail in FIG. 2 back up the cam 23. The bearings, in turn, lie in a bearing race 27 fixed operatively within the housing 12. Thus, the roller bearings engage surface 35 of cam 23 and this pump piston actuating cam 23 is held captive at an oblique angle between the roller bearings and the pump pistons.

As cylinder 13 rotates, the individual pistons 17 and 18 and the cam 23 rotate with it, however, bearing race 27 remains fixed in its oblique orientation. Thus, the individual pistons are depressed rightwardly and then returned to their leftward extreme positions (eg. see piston 18) effecting a pumping action through appropriate valving (not shown). When one piston is in its fully depressed position (eg. see piston 17), those pistons nearly diametrically opposed are in nearly fully or full extended positions. Each piston is in some portion of its operating cycle at all times, but no two are simultaneously at the same portion. One piston begins its rightward travel and later the next begins its rightward travel. This sequential commencing of each cycle is described as sequential piston operation.

Comparing FIGS. 1 and 2, the roller bearing 22 which supports the cam 23 for rotation relative to the housing 12 has the plurality of roller elements 25 and 26 which are held captive in a bearing cage 30 which maintains the relative locations of the roller elements. In FIG. 2 the roller elements 25 and 26 are seen to be generally cylindrical rollers disposed with their cylindrical axes in a radial pattern. The cage 30 includes radially inner portion 31 and a radially outer portion 29 having inwardly and outwardly facing surfaces respectively.

To maintain the position of bearings relative to cam 23 and housing 12, an annular skirt or guide surface 33 extends from the cam member 23 and an outer cylindrical surface 34 thereof sliding engages an inwardly facing surface of the radially inner portion 31 of the cage. If skirt 33 is omitted, the bearing with its cage is undesirably free to move in the plane of FIG. 2 until the outer portion 29 of the cage engages a sidewall portion of bearing race 27. Thus, guiding or properly locating the cage 30 and bearings is achieved by the formation of the cylindrical surface or skirt 33 as an integral part of the rotating cam element, e.g., by extending the volume of the cam 23 through the center of the bearing cage 30.

A similar cage guide could be formed by extending the cam volume over the circumference of the cage to engage the outer portion 29 of the cage, however, the illustrated inner guide is preferred. One measure of frictional losses involves the product of pressure and velocity. The velocity of the outer guide portion 29 is greater than the velocity of the inner portion 31, hence frictional losses incident to guiding that outer portion would be larger. The bearing cage would move at one half the angular velocity of the cam and it would not otherwise matter whether the cage is guided by a surface fixed to the housing or one fixed to the cam. However, the friction force of the rotating guide acts to assist the cage in its rotation and directs the cage away from the guide, decreasing the contact force between the cage and the guide. Contrary to this, prior designs have provided a stationary guide which acts to cause the friction force to increase the contact force between the cage and the guide to thereby inhibit rotation of the cage.

What is claimed is:

1. A pump mechanism having a housing, a plurality of pump pistons disposed generally in a circular pattern about a drive shaft and reciprocable relative to the housing along a like plurality of parallel axes, a cam member obliquely disposed relative to the parallel axes for engaging sequentially and actuating the pump pistons, and a roller bearing having a plurality of roller elements and a cage maintaining relative locations of the roller elements to support the cam for rotation relative to the housing, the improvement comprising means for maintaining the position of the bearing relative to the cam and housing and comprising an annular skirt extending from the cam and engaging slidingly a peripheral portion of the cage, the annular skirt maintaining the roller bearing position relative to the cam and located away from the drive shaft to prevent the transfer of piston radial side loads upon the drive shaft.

2. The improvement of claim 1, wherein the cage includes radially inner and outer portions having inwardly and outwardly facing surfaces respectively, and the annular skirt engages an inwardly facing surface of the radially inner portion of the cage.

3. The improvement of claim 1, wherein the roller elements are generally cylindrical rollers disposed with axes in a radial pattern.

4. A roller bearing in combination with a plurality of radially disposed cylindrical pistons having parallel cylindrical axes, the pistons being radially spaced about a drive shaft and the drive shaft rotatable about an axis generally parallel to each piston axis, the roller bearing comprising a plurality of roller elements, a bearing cage for maintaining relative locations of the roller elements, a disk having one face engaging and supported by the bearing, a skirt extending from the disk and engaging slidingly the bearing cage to maintain locations of the bearing elements relative to the disk, and the pistons engaging the other face of the disk, wherein the skirt is located away from the drive shaft to prevent the transfer of piston radial side loads upon the drive shaft.

5. The roller bearing of claim 4, wherein the cage includes radially inner and outer cylindrical surface portions and the skirt engages slidingly the radially inner cylindrical surface portion.

6. The combination of claim 4, wherein the piston axes extend obliquely relative to the other face of the disk whereby rotation of the drive shaft about its axis causes sequential reciprocal movement of the pistons.

7. The combination of claim 4, wherein as the drive shaft rotates, the disk rotates in unison therewith.

8. The combination of claim 4, wherein the roller elements are generally cylindrical rollers disposed with cylindrical axes in a radial pattern.

9. A roller bearing in a pump and comprising a plurality of generally cylindrical roller elements, a bearing cage for maintaining the roller elements axes in a radial configuration, a plurality of pump pistons disposed generally in a circular pattern and reciprocable along a plurality of parallel axes, the pistons radially spaced about a drive shaft and the drive shaft rotatable about an axis generally parallel to each piston axis; and a pump piston actuating cam captive between the roller bearing and the pump pistons and including a skirt extending from the cam and engaging slidingly the bearing cage to maintain the locations of the roller elements relative to the cam, wherein the skirt is located away from the drive shaft to prevent the transfer of piston radial side loads upon the drive shaft.

10. The combination of claim 9, wherein the cage includes radially inner and outer cylindrical surface portions and the skirt engages slidingly the radially inner cylindrical surface portion.

11. The combination of claim 9, wherein the piston axes extend obliquely relative to cam whereby rotation of the drive shaft about its axis causes sequential reciprocal movement of the pistons.

12. The combination of claim 9, wherein as the drive shaft rotates, the cam rotates in unison therewith.

13. The combination of claim 9, wherein the cam comprises a cylindrical surface extending from the cam and engaging slidingly the bearing cage.

* * * * *